Figure 3:
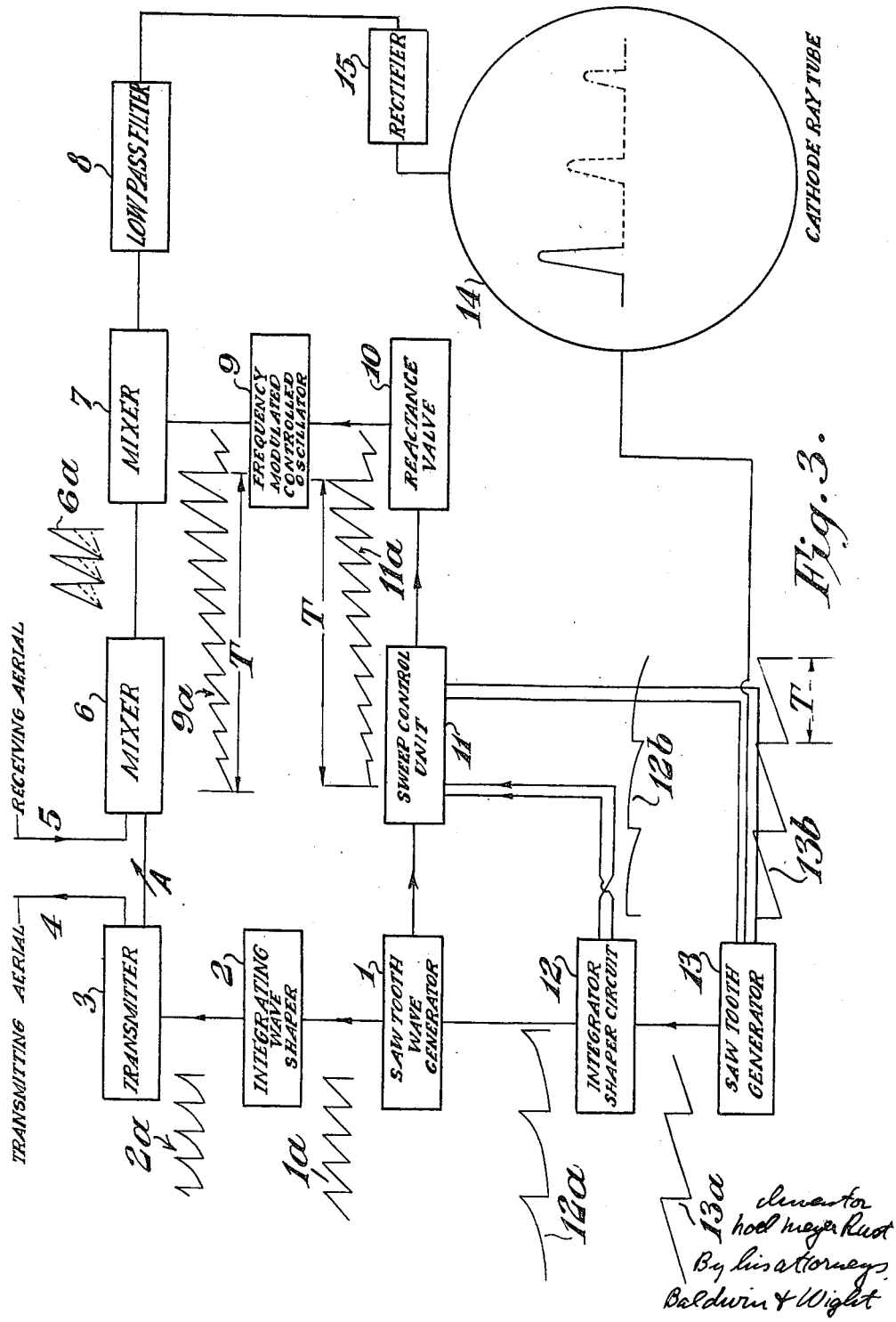

March 5, 1963        N. M. RUST        3,080,558
RANGE RADAR USING SAWTOOTH FREQUENCY MODULATION
Filed Oct. 31, 1950        2 Sheets-Sheet 1
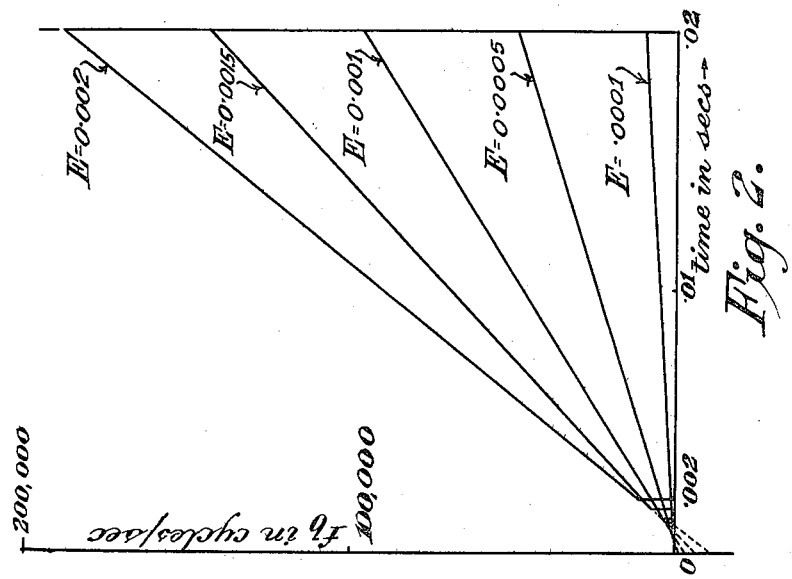
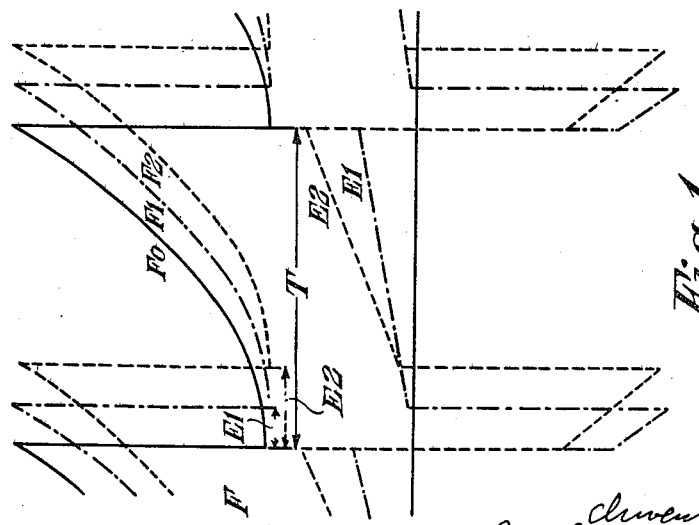

United States Patent Office 3,080,558
Patented Mar. 5, 1963

3,080,558
RANGE RADAR USING SAWTOOTH
FREQUENCY MODULATION
Noel Meyer Rust, Chelmsford, England, assignor to Marconi's Wireless Telegraph Company Limited, London, England, a company of Great Britain
Filed Oct. 31, 1950, Ser. No. 193,139
Claims priority, application Great Britain Nov. 11, 1949
5 Claims. (Cl. 343—14)

This invention relates to radar systems and more particularly to frequency modulated (F.M.) radar systems of the so-called panoramic receiver type i.e. to radar systems in which reflected or echo energy originally transmitted from a continuous wave transmitter whose frequency is cyclically varied in accordance with a predetermined law is mixed with energy direct from the transmitter to produce beat notes which are then analysed by a so-called swepeing or analysing oscillator which sweeps them across the pass band of a fixed frequency narrow pass band filter. As is well known, for any given rate of change of the transmitted wave each target range has its corresponding definite beat freqency so that, in a system of the type referred to, the ranges of the different targets giving rise to received echoes can be ascertained in turn as the sweeping oscillator brings their respective beat notes into the pass band of the filter and can be displayed on a cathode ray tube which is operated by output from the filter and simultaneously subjected to deflection corresponding to the momentary frequency of the sweeping oscillator.

An important advantage of radar systems of the type referred to, as compared with radar systems of the pulsed transmission type, is that, owing to the narrowness of the acceptance band of the filter, they are less liable to serious disturbance by radio interference. Nevertheless it is possible seriously to "jam" such systems. Thus a jamming transmitter, arranged to transmit a frequency modulated signal during the same frequency excursion as the radar transmitter and passing through its cycle of frequency variation at a rate which was high in relation to the range scanning rate of the radar system (i.e. the rate of variation of the sweeping oscillator) would produce serious interference. Thus if the radar system was arranged in known manner to give a P.P.I. or sector scan display, and jamming station would produce a radial streak on the display which, if the station was powerful enough, would effectively blot out all radar intelligence in the direction of the jamming station.

The present invention seeks to provide improved F.M. radar systems of the type referred to which shall be much more difficult to jam than are known comparable systems and, in particular, shall be such as not to be subject to "radial streak" jamming in the manner just described.

According to this invention the transmitter of a F.M. radar system of the type referred to is subjected to frequency modulation in such manner that the beat frequency produced by mixing echo energy with energy then being transmitted is a cyclically varying beat frequency characteristic of the range of said echo and the sweeping oscillator is also subjected to freqency modulation in such manner as to produce, when mixed with said beat frequency, energy which will pass the filter of the receiver whenever the range of frequency variation of the oscillator corresponds to that of the varying beat freqency.

In general the variation law of the oscillator should approximate to the first differential with respect to time of the frequency modulation law of the transmitter. Thus, if the transmitter freqency is varied in accordance with a parabolic law, the oscillator should follow a rectilinear law; if the transmitter modulation law is cubic, the oscillator should follow a parabolic law . . . and so on. Clearly there is an almost infinite choice of possible laws but, for the sake of clarity and simplicity in description, it will be assumed, in the remainder of this specification, that the transmitter law is parabolic, as is at present preferred.

The invention is illustrated in and further explained in connection with the accompanying drawings in which figures FIGURES 1 and 2 are explanatory graphical figures and FIGURE 3 is a block diagram of one embodiment.

Suppose the transmitter of a F.M. radar system in accordance with this invention is subjected to frequency modulation in such manner that the instantaneous transmitted requency $f_0$ is as given by the equation:

$$f_0 = at^2 + F$$

where $t$ is time, and $a$ and $F$ are constants and suppose that this freqency is repeated at intervals of time from $t=0$ to $t=T$, from $t=T$ to $t=2T$ ... and so on where T is the repetition period. Then an echo signal arriving with an echo time delay E will, considering only one repetition cycle, have a frequency $f = a(t-E)^2 + F$ from time E to time T and a frequency $f = a[(T-E)+t]^2 + F$ from time 0 to time E. The instantaneous difference (beat) freqency $f_b = f_0 - f$ is therefore $$2aE\left(t - \frac{E}{2}\right) = 2aEt - aE^2$$

from time E to time T and $$-2a(T-E)\left[t + \frac{(T-E)}{2}\right]$$

from time 0 to time E. If the repetition time T is made as large as possible in relation to the echo time E, the relatively short period 0 to E may be disregarded and only the time E to T considered. For this period the beat freqency $f_b = 2aAt - aE^2$ comprises a part $2aEt$ which varies rectilinearly with time, and a negative part $-aE^2$ which varies as the square of the echo time and therefore of the range of the target. This is illustrated in FIGURE 1 which shows, in its upper part, the full line parabolic curve $F_0$ of transmitted freqencies sent during one repetition period T, and the chain and broken line curved $F_1$ and $F_2$ of echo freqencies received from targets whose echo times (ranges) are $E_1$ and $E_2$ respectively. Beneath these curves are shown in chain and broken lines respectively the curves of the instantaneous difference frequencies $F_0 - F_1$ and $F_0 - F_2$, these curves also being given the references $E_1$ and $E_2$ to indicate that they correspond to the echo times $E_1$ and $E_2$.

To take an illustrative numerical example, consider the case of a system designed to intercept targets up to a range of 200 miles and in which the total deviation range of the transmitter is 1 mc. thus giving a resolution of the order of 300 metres. Suppose also that T is ten times the maximum echo time $E_{max}$ with which the system must deal so that $$T = 10E_{max} = 10 \times 0.002 = 0.02 \text{ sec.}$$

Then $aT^2 = 1,000,000$ and $a = 2.5 \times 10^9$. In FIGURE 2 the difference (beat) frequencies $f_b$ are plotted out as ordinates for various values of E. As will be seen the result is a series of straight lines whose slope is directly proportional to echo time (and therefore range) and which originate on the frequency axis from points displaced below the time abscissa line by the appropriate values of $aE^2$ and cross the time axis at points displaced by the appropriate values of $E/2$ from the origin. From FIGURE 2 it will be apparent that the compound frequency spectrum due to a plurality of targets picked up by this system can be satisfactorily analysed by an analysing oscillator whose frequency is either slid successively along the series of curves typified by the family shown in the said FIGURE 2 or is varied so as to maintain a constant difference frequency therefrom. The former case, of course, involves zero beat detection methods and the latter case intermediate frequency (I.F.) detection methods. FIGURE 3 is a block diagram illustrating an embodiment of the invention using zero beat detection methods.

Referring to FIGURE 3 a saw tooth wave generator 1 whose wave form is conventionally indicated at 1a feeds into an integrating wave shaper 2 which produces from its input a "parabolic" saw-tooth as indicated at 2a. This wave form is employed to modulate the frequency transmitted from the transmitter 3 so that wave form 2a may also be regarded as the curve connecting instantaneous transmitted frequency (ordinates) with time (abscissae). The transmitting aerial, which may be of any known form and, if desired, arranged to scan a desired volume of space in azimuth and elevation is represented at 4. The receiving aerial is indicated at 5 and feeds into a first mixer 6 which also receives, as its second input, energy (controllable in strength as conventionally indicated by the arrow A) direct from transmitter 3. The output from mixer 6 will consist of linearly varying beat notes as conventionally indicated at 6a in much the same fashion as is adopted for FIGURE 2. The output from mixer 6 is passed to a second mixer 7 which forms part of a zero beat detector system comprising the mixer 7 and the following low pass filter 8. The second input to the mixer 7 is taken from an automatically controlled, frequency modulated controlled oscillator 9 whose output is represented at 9a by means of a graph in which the ordinates are values of frequency and the abscissae are values of time. Control of the oscillator 9 is effected in known manner by a reactance valve 10 in turn controlled by a sweep control unit 11 which provides a control voltage as represented graphically at 11a in which voltage is plotted as ordinates against time. The sweep control output 11a is the combined resultant of three inputs namely, a saw tooth input as at 1a from the saw-tooth generator 1, a parabolic or square law correction input from an integrating shaper circuit 12 and a linear component input from a saw tooth generator 13. The generator 13 provides a saw tooth wave as at 13b which is supplied as time base deflection control to the display cathode ray tube 14, indicated for simplicity as giving a so-called "A" display and is also supplied to the shaper 12. This shaper transforms the wave 13a into a parabolically shaped wave 12a and this is reversed in sign to produce the wave 12b which is fed to the unit 11. The output from the low pass filter 8 is smoothed and rectified by a suitable unit 15 and fed to the tube 14 to produce vertical deflection therein. Obviously other forms of display e.g. P.P.I. display may be provided by suitably modifying the apparatus in manner well known to those skilled in the art.

I claim:

1. An F.M. radar system comprising a continuous wave transmitter, means for modulating the frequency transmitted in accordance with a first predetermined law of variation, a receiver, means for mixing received echo energy with energy then being transmitted to produce a cyclically varying beat frequency characteristic of the range of a target from which said echo is reflected, a sweeping oscillator in said receiver, means for mixing energy from said sweeping oscillator with said beat frequency, a frequency selective filter, means for feeding the resultant obtained by mixing energy from the oscillator with said beat frequency to said filter, and means for modulating the frequency of said oscillator in accordance with a second predetermined law which is substantially the first differential with respect to time of said first mentioned predetermined law whereby whenever the range of frequency variation of the oscillator corresponds to that of the varying beat frequency, said resultant obtained by mixing is within the predetermined pass band of said filter.

2. A system as claimed in claim 1 wherein the first mentioned predetermined law is substantially a parabolic law and the second predetermined law is substantially a linear law.

3. A system as claimed in claim 1 wherein the first mentioned predetermined law is substantially a parabolic law and the second predetermined law is substantially a linear law and wherein the oscillator frequency is modulated in such manner as to slide the same successively along a series of rectilinear curves each connecting beat frequency with time and each corresponding to a different echo time.

4. A system as claimed in claim 1 wherein the first mentioned predetermined law is substantially a parabolic law and the second predetermined law is substantially a linear law and wherein the oscillator frequency is modulated in such manner as to maintain the same with a constant frequency difference from the frequencies given by sliding successively along a series of rectilinear curves each connecting beat frequency with time and each corresponding to a different echo time.

5. An F.M. radar system comprising a continuous wave transmitter, means for modulating the frequency transmitted in accordance with a parabolic saw tooth law, a receiver, a first mixer mixing transmitted and echo waves; a sweeping oscillator; a second mixer fed from said first mixer and from said sweeping oscillator; a reactance valve connected to control the frequency of said oscillator; a sweep control unit connected to control said reactance valve said unit providing a control wave which is the combined resultant of a linear saw tooth wave of the same frequency as that of the said parabolic saw tooth law, a square law correction wave and a further linear saw tooth wave the last mentioned two waves being of the same frequency; and a low pass filter fed from the second mixer.

References Cited in the file of this patent

UNITED STATES PATENTS

| | | |
|---|---|---|
| 2,415,591 | Henroteau | Feb. 11, 1947 |
| 2,417,815 | Earp | Mar. 25, 1947 |
| 2,423,088 | Earp | July 1, 1947 |
| 2,433,804 | Wolff | Dec. 30, 1947 |
| 2,508,400 | Kiebert | May 23, 1950 |
| 2,520,553 | Lawson | Aug. 29, 1950 |
| 2,557,864 | Doremus | June 19, 1951 |

FOREIGN PATENTS

| | | |
|---|---|---|
| 893,152 | France | June 1, 1944 |